(12) United States Patent
Zheng et al.

(10) Patent No.: US 11,687,479 B2
(45) Date of Patent: Jun. 27, 2023

(54) SYSTEM EVENT BROADCAST SYNCHRONIZATION ACROSS HIERARCHICAL INTERFACES

(71) Applicant: International Business Machines Corporation, Armonk, NY (US)

(72) Inventors: Jie Zheng, Poughkeepsie, NY (US); Deanna Postles Dunn Berger, Hyde Park, NY (US); Chad G. Wilson, Poughkeepsie, NY (US); Poornima P Sulibele, Karnataka (IN); James Franklin Driftmyer, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 17/482,528

(22) Filed: Sep. 23, 2021

(65) Prior Publication Data

US 2023/0085998 A1    Mar. 23, 2023

(51) Int. Cl.
*G06F 13/40*    (2006.01)
*G06F 1/24*    (2006.01)
*G06F 13/362*    (2006.01)

(52) U.S. Cl.
CPC ............ *G06F 13/4059* (2013.01); *G06F 1/24* (2013.01); *G06F 13/362* (2013.01); *G06F 13/4045* (2013.01)

(58) Field of Classification Search
CPC ............... G06F 13/362; G06F 13/4045; G06F 13/4059; G06F 1/24
See application file for complete search history.

(56) References Cited

U.S. PATENT DOCUMENTS

| 6,185,613 | B1 | 2/2001 | Lawson et al. |
| 9,628,243 | B2 | 4/2017 | Zheng et al. |
| 10,339,064 | B2* | 7/2019 | Blake .................... G06F 12/084 |
| 10,606,777 | B2 | 3/2020 | Krolak et al. |
| 11,487,672 | B1* | 11/2022 | Rhee .................. G06F 12/0822 |
| 2019/0340494 | A1 | 11/2019 | Thorpe et al. |
| 2020/0151686 | A1 | 5/2020 | Komandur et al. |

OTHER PUBLICATIONS

Anonymously, An Event System Based on Distributed Ledger Technology, Nov. 13, 2019, 6 pages.

(Continued)

*Primary Examiner* — Brian T Misiura
(74) *Attorney, Agent, or Firm* — Cantor Colburn LLP; Jeffrey Ingalls

(57) ABSTRACT

Aspects of the invention include computer-implemented methods, systems, and computer program products that assign a centralized event tag to each communication interface of a plurality of communication interfaces of a chip interconnected in a hierarchy through the communication interfaces to a plurality of chips in a multiprocessing system. A determination is performed of whether to accept or drop a message associated with an event received at one of the communication interfaces of the chip based on comparing a local centralized event tag with a received centralized event tag. The local centralized event tag is updated based on one or more advancing rules to maintain event synchronization between the chip and the plurality of chips.

20 Claims, 9 Drawing Sheets

(56) References Cited

OTHER PUBLICATIONS

Chan, H. et al., Round-Efficient Broadcast Authentication Protocols for Fixed Topology Classes, May 2010, 16 pages.

Huang, R. et al., Mechanism for Synchronous Enhanced Beacon Transmission in Low-Power and Lossy Networks, Feb. 26, 2018, 10 pages.

Huang, R. et al., Self-Deterministic Power Outage Notifications in Low Power and Lossy Networks, Apr. 24, 2018, 6 pages.

Stettler, M. et al., A Distributed Timing System for Synchronizing Control and Data Correlation, Proceedings of the 1992 Linear Accelerator Conference, Ottawa, Ontario, Canada, Aug. 1992, 3 pages.

Wu, J., Distributed System Design: An Overview, 2016, 340 pages.

* cited by examiner

SYSTEM EVENT BROADCAST SYNCHRONIZATION ACROSS HIERARCHICAL INTERFACES

BACKGROUND

The present invention generally relates to data processing, and more specifically, to system event broadcast synchronization across hierarchical interfaces in symmetric multiprocessing computers.

Contemporary high-performance computer systems are typically implemented as multi-node, symmetric multiprocessing ('SMP') computers with many compute nodes. SMP is a multi-processor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which may have at least some local memory, at least some of which is accelerated with cache memory. The cache memory can be local to each processor, local to a compute node shared across more than one processor, or shared across nodes. All of these architectures require maintenance of cache coherence among the separate caches.

To maintain cache coherency and synchronization in general, events and status messages can be broadcast across chips of the system. There can be multiple communication paths to connect the chips in a hierarchical structure. If a new event is broadcast before a previous event completes, it is possible for one or more chips to lose synchronization, and one event may override another. Polling and waiting for event completion status on all chips may add excessive delays and reduce overall system performance.

SUMMARY

According to one or more embodiments of the present invention, a computer implemented method includes assigning a centralized event tag to each communication interface of a plurality of communication interfaces of a chip interconnected in a hierarchy through the communication interfaces to a plurality of chips in a multiprocessing system. The method also includes determining whether to accept or drop a message associated with an event received at one of the communication interfaces of the chip based on comparing a local centralized event tag with a received centralized event tag. The local centralized event tag is updated based on one or more advancing rules to maintain event synchronization between the chip and the plurality of chips.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods for system event broadcast synchronization across hierarchical interfaces in a distributed and indirectly connected system of chips. Embodiments can include a method to automatically synchronize an event on a broadcast network and allow a new broadcast event to start without waiting for all chips to post completion status for the previous event broadcast. Embodiments can also include a method to detect and avoid redundant broadcast events going to a remote location (e.g., a remote drawer in a multi-drawer configuration) and avoiding broadcast events overriding each other from different chips.

Embodiments can reduce the impact of maintaining system-level event synchronization, particularly where a localized error condition occurs. For example, when an event is broadcast to chips across an SMP system, every chip may need to know the system-wide completion status, but not all chips post completion status at the same time. In one or more embodiments, only the chip of a requesting core may be polled for event completion status rather than waiting for event completion status of all chips within the system. Through the use of centralized event tags (CETs), event synchronization can be managed for each communication interface of a chip, where a local CET is tracked with respect to a received CET for each communication interface. CET values can be advanced where one or more advancing rules are met to handle various types of conditions, such as reset conditions. A replay buffer associated with a communication interface can be managed to support event or status message replay under certain conditions while continuing to manage synchronization of broadcast sequences. One or more scoreboards can be used to track various types of status, such as one-to-all status for events that may need to be rebroadcast within the system. The scoreboards can be used to avoid redundant event broadcasts for a remote drawer and to avoid events from overriding each other from different chips.

Figure 1:
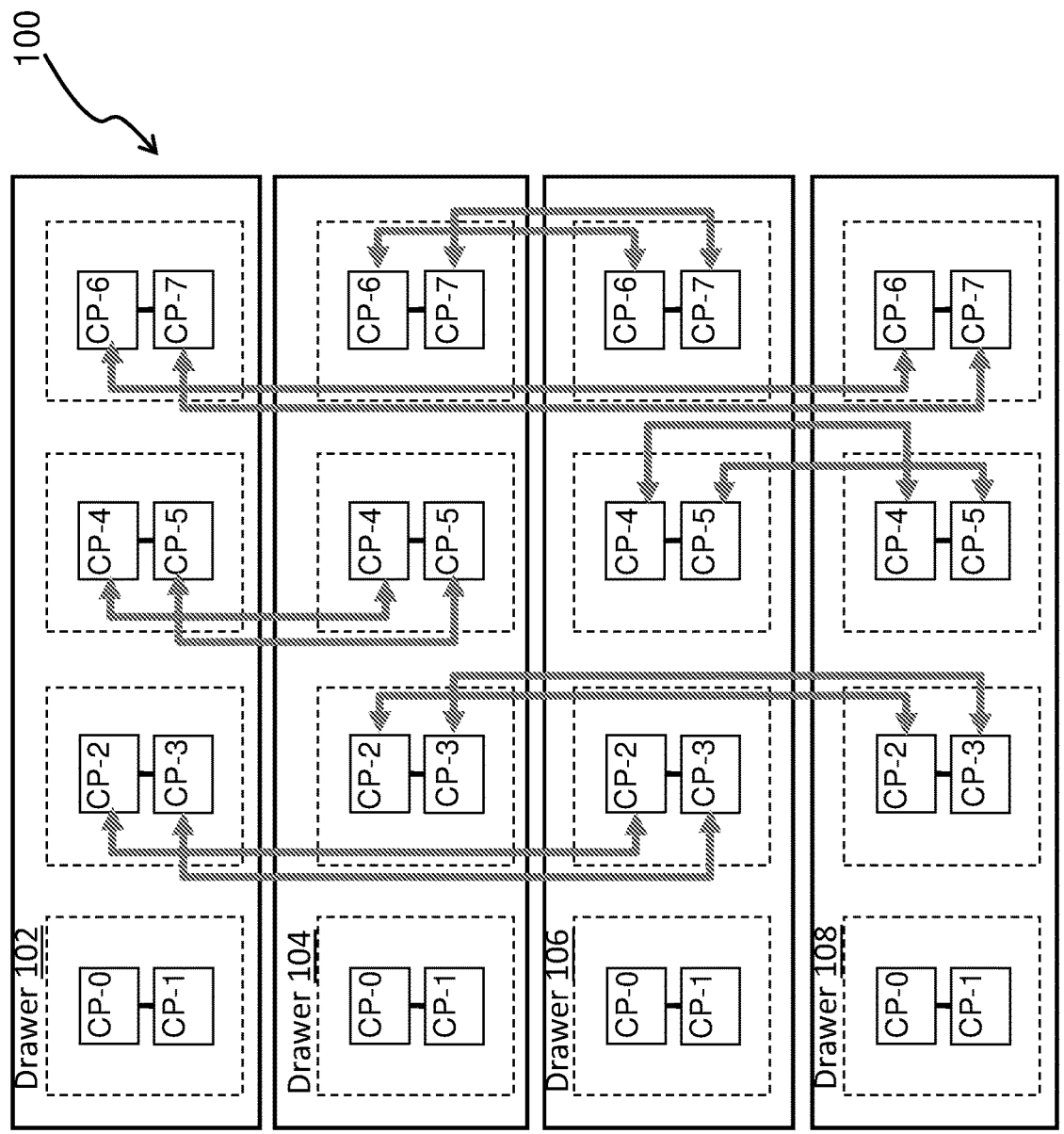
FIG. 1 depicts a distributed symmetric multiprocessing (SMP) system in accordance with one or more embodiments of the invention.

Turning now to the figures, FIG. 1 depicts a multiprocessing system 100 (hereafter "system 100") in accordance with one or more embodiments, which can be a distributed symmetric multiprocessing (SMP) system. System 100 can include 4 processing units or "drawers." Each drawer 102, 104, 106, 108 includes eight (8) microprocessor (CP) chips (CP0 . . . CP7) in this example. Each CP chip can include eight (8) cores. Each drawer 102, 104, 106, 108 contains up to 8 CP chips with a fully connected topology. Interconnection between the drawers can be constrained such that each drawer 102-108 has a pair of bus connections to the other drawers. Accordingly, some CP chips can directly communicate with another drawer, while other CP chips may communicate indirectly to a remote drawer through a CP chip in the same local drawer.

As one example, as depicted in FIG. 1, CP2 and CP3 of drawer 102 can directly communicate with CP2 and CP3 respectively of drawer 106. CP4 and CP5 of drawer 102 can directly communicate with CP4 and CP5 respectively of drawer 104. CP6 and CP7 of drawer 102 can directly communicate with CP6 and CP7 respectively of drawer 108. Thus, for CP0 or CP1 of drawer 102 to communicate with drawer 104, a message must pass through CP4 or CP5 of drawer 102. Similarly, for CP0 or CP1 of drawer 102 to communicate with drawer 106, a message must pass through CP2 or CP3 of drawer 102. For CP0 or CP1 of drawer 102 to communicate with drawer 108, a message must pass through CP6 or CP7 of drawer 102. It will be understood that the arrangement of elements and communication links as depicted in FIG. 1 is one example and other variations with different numbers of elements and links are contemplated.

Figure 2:
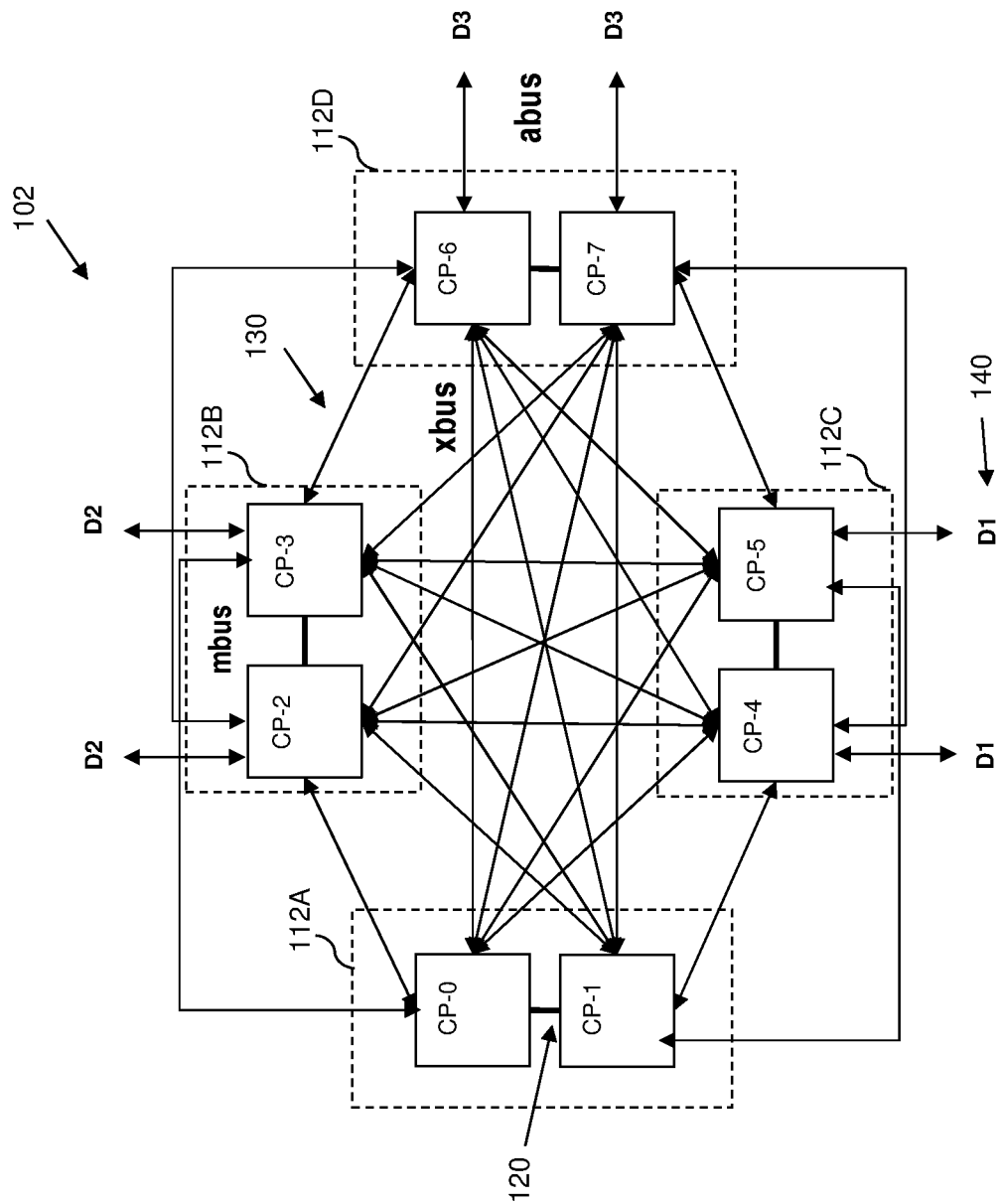
FIG. 2 depicts a block diagram of a drawer of the SMP of FIG. 1 according to one or more embodiments of the invention.

FIG. 2 depicts a block diagram of drawer 102 of system 100 of FIG. 1 illustrated in greater detail according to one or more embodiments of the invention. The CP chips, CP0-CP8 are grouped in modules 112 as pairs. For example, CP0 and CP1 are grouped in module 112A, CP2 and CP3 are grouped in module 112B, CP4 and CP5 are grouped in module 112C, and CP6 and CP7 are grouped in module 112D. Each CP chip pair in a module 112 can communicate using a module bus 120. For example, CP0 and CP1 of module 112A can communicate with each other through module bus 120 (also referred to as the MBUS). Each CP chip within drawer 102 can communicate between modules 112A-112D using a cross-module bus 130 (also referred to as the XBUS). The cross-module bus 130 can include a plurality of links between communication interfaces of each CP chip, CP0-CP8. For example, CP0 can use separate links of the cross-module bus 130 to communicate directly with CP2, CP3, CP4, CP5, CP6, and CP7.

Drawer-to-drawer communication can be performed by system bus 140 (also referred to as the ABUS). For example, the system bus 140 can be used to communicate with a first drawer D1, such as drawer 104 of FIG. 1 through CP4 or CP5, a second drawer D2, such as drawer 106 of FIG. 1 through CP2 or CP3, and/or a third drawer D3, such as drawer 108 of FIG. 1 through CP6 or CP7. Although a specific example is illustrated in FIG. 2, other link combinations and groups of elements can be implemented in various embodiments. Thus, the multiprocessing system 100 can include a plurality of drawers 102-108 connected through a system bus 140, a plurality of modules 112 per drawer connected through a cross-module bus 130, and at least two of the CP chips per module 112 connected through a module bus 120. The description of hierarchical elements, such as chips, modules, drawers, and system are examples. These could represent various hierarchical groupings into a plurality of scopes.

Figure 3:
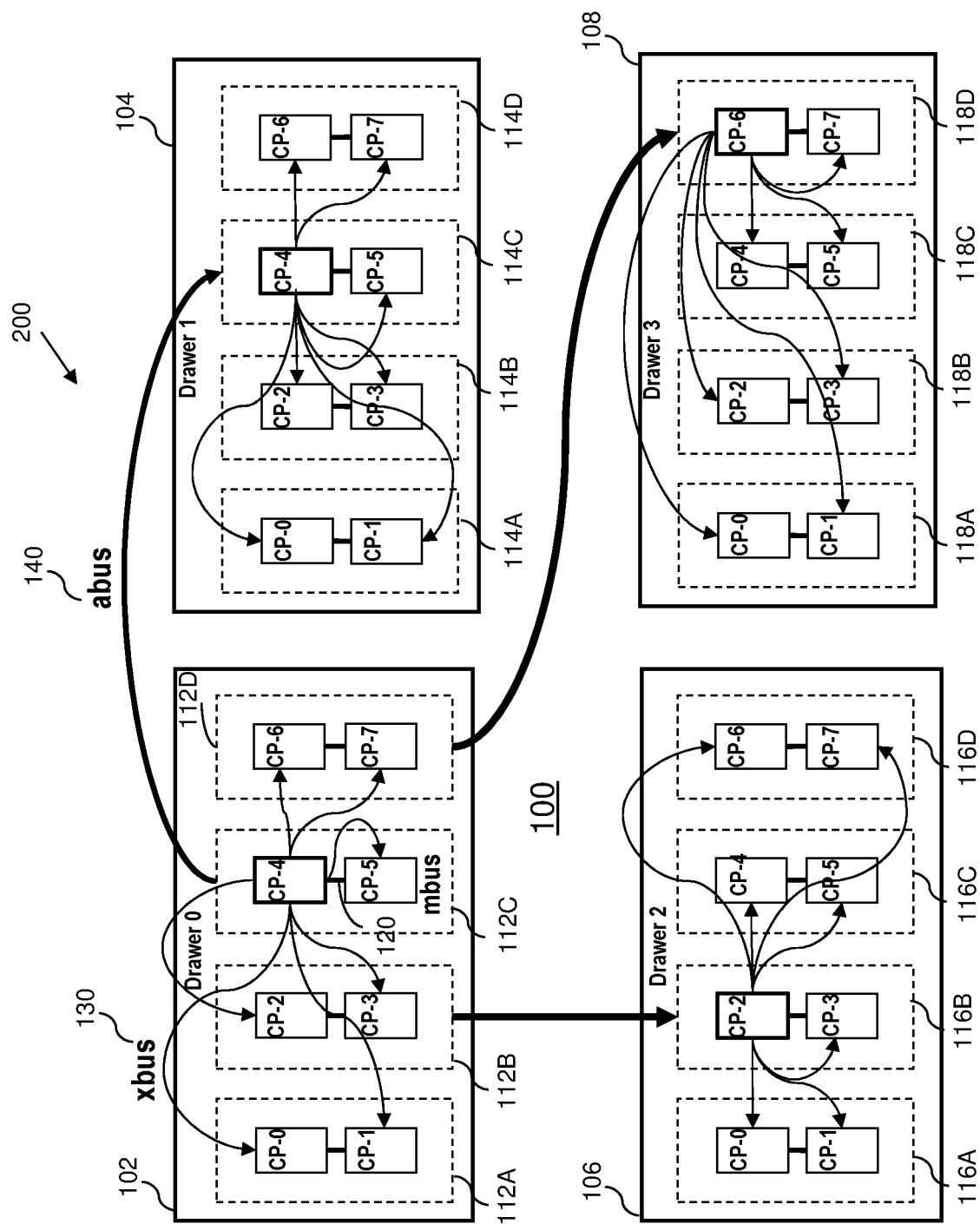
FIG. 3 depicts a block diagram of a message flow within an SMP system according to one or more embodiments of the invention.

FIG. 3 depicts a block diagram of a message flow 200 according to one or more embodiments. FIG. 3 illustrates an example of the system 100 of FIG. 1 with message propagation through various elements to reach CP chips across the system 100. For example, to send a message, such as broadcasting a system event or status, from CP4 of drawer 102, module bus 120 can send the message to CP5 of module 112C. Multiple links of cross-module bus 130 can be used to send the message to CP0 and CP1 of module 112A, CP2 and CP3 of module 112B, and CP6 and CP7 of module 112D. The message can propagate to drawers 104, 106, and 108 through links of the system bus 140. For example, the message can be sent from CP4 of drawer 102 to CP4 of drawer 104, from CP2 of drawer 102 to CP2 of drawer 106, and from CP6 of drawer 102 to CP6 of drawer 108. Local to drawer 104, CP4 can send the message to CP5 locally within module 114C using a link of module bus 120. Within drawer 104, multiple links of cross-module bus 130 can be used to send the message to CP0 and CP1 of module 114A, CP2 and CP3 of module 114B, and CP6 and CP7 of module 114D. Local to drawer 106, CP2 can send the message to CP3 locally within module 116B using a link of module bus 120. Within drawer 106, multiple links of cross-module bus 130 can be used to send the message to CP0 and CP1 of module 116A, CP4 and CP5 of module 116C, and CP6 and CP7 of module 116D. Local to drawer 108, CP6 can send the message to CP7 locally within module 118D using a link of module bus 120. Within drawer 108, multiple links of cross-module bus 130 can be used to send the message to CP0 and CP1 of module 118A, CP2 and CP3 of module 118B, and CP4 and CP5 of module 118C.

Embodiments can use a system sideband frame message (SSFM) to broadcast events and status within the system 100. All-to-all (A2A) messages can broadcast events off chip across the system 100, such as a status sourced from every CP chip in the system 100 to be seen by every CP chip in the system 100. Different scopes can be used, such a in-scope (IS) and full-system (FS). An event achieved, such as a quiesce event, on a CP chip can be sent IS on the module bus 120 and cross-module bus 130 to reach all CP chips in the same drawer. For an event achieved on a drawer, a message can be sent IS on the system bus 140 to a remote drawer. For an event achieved on CP chip and on a remote drawer, a message can be sent FS to all CP chips on the drawer through the module bus 120 and cross-module bus 130. Thus, for a quiesce event achieved on CP4 of drawer 102, an A2A broadcast IS of an SSFM can be performed to CP0-CP3 and CP5-CP7 on drawer 102. If an IS or FS SSFM is received from all CP chips on drawer 102, then an A2A broadcast IS SSFM to remote drawers 104, 106, 108 can be performed via system bus 140. If an IS SSFM is received from a remote drawer and the event is achieved on-chip, then an A2A broadcast FS SSFM can be performed to all of the CP chips on the drawer, such as drawer 102. If an FS SSFM is received from all CP chips on CP4 of drawer 102, then a broadcast event completion status can be set for CP4 of drawer 102. Other types of messages and broadcasts may be received that are not SSFM, such as a system-wide reset (SWR).

It can be possible for synchronization issues to arise between CP chips. For example, CP4 of drawer 102 can receive all FS SSFM and set an event status (e.g., event-A) to complete, and an SWR can be issued. If there is a communication issue, for instance, where the cross-module bus 130 between CP0 and CP3 of drawer 102 is unavailable, then CP0 and CP3 would not receive FS SSFM from each other. Therefore, the status of event-A would not be complete on CP0 and CP3 before the SWR arrives. In contrast, all of the other CP chips in drawer 102 may have completed event-A and the SWR has been received. If a new event (e.g., event-B) starts on CP5 of drawer 102, CP5 broadcasts event-B IS SSFM to all of the CP chips on drawer 102. However, CP0 and CP3 are still working on an old event (event-A) and need to know the incoming SSFM is for the new event (event-B). If the SWR arrives at CP0 but not CP3 before event-B arrives, then CP0 would move on to event-B while CP3 replays event-A FS SSFM to CP0 after the cross-module bus 130 between CP0 and CP3 of drawer 102 becomes available. If CP0 is currently working on the new event (event-B), CP0 would need to know that the incoming SSFM is for the old event (event-A). If the system bus 140 between drawers 106 and 108 was unavailable, then drawers 106 and 108 working on the old event (event-A) would need to know that the incoming SSFM from drawer 102 is for the new event (event-B). If the SWR arrived on drawers 106 and 108 before event-B, then drawers 106 and 108 would move onto to the new event (event-B), and drawers 106 and 108 would need to know that the incoming SSFM is for the old event (event-A) after the link became available. In this case, the incoming SSFM for the old event would have been coming from a respective abus replay buffer after the link became available.

Embodiments can use CETs to address potential synchronization issues. For example, SSFM event synchronization can be performed by first setting CET to zero on all of CP chips. Extending the previous example, when CP1, CP2, CP4, CP5, CP6, and CP7 of drawer 102 are done with an event, local CET values can be advanced (e.g., LCET=1). However, LCET values for CP0 and CP3 would remain at zero if missing status from each other due to a link error on the cross-module bus 130 between CP0 and CP3. CP5 can broadcast a new event with a CET of 1. CP0 can receive SSFM from CP5 with a remote CET (RCET) of 1 which is newer than the LCET of 0. This can result in CP0 generating an inferred reset, clearing all SSFM received at CP0, setting a status to done for a prior event, advancing LCET to 1, and saving the new SSFM event from CP5. When the link between CP0 and CP3 becomes available, CP3 may replay SSFM with CET=0 to CP0. When CP0 receives SSFM from CP3 with an RCET=0, this would be older than the current LCET=1. Therefore, CP0 can drop the SSFM from CP3. If SWR arrives at CP3, then CP3 can clear SSFM and advance LCET to 1. If CP3 receives SSFM from CP5, where RCET and LCET are both 1, the SSFM from CP5 can be accepted.

If drawers 106 and 108 have an LCET of zero, the drawer status may be missing from each other, for instance, due to a link error on system bus 140 between drawers 106 and 108. Drawer 102 may broadcast a new event with CET=1 to CP6 of drawer 108. CP6 of drawer 108 receives the SSFM from drawer 102 and determines that RCET of 1 is newer than LCET of 0 and can generate an inferred reset, clear all SSFM received at CP6, set a status to done for a prior event, advance LCET to 1, and save the new SSFM event from drawer 102. A broadcast from CP6 of drawer 108 would synchronize CET=1 for all CP chips on drawer 108. Replay from drawer 106 with CET=0 would be dropped by drawer 108.

Figure 4:
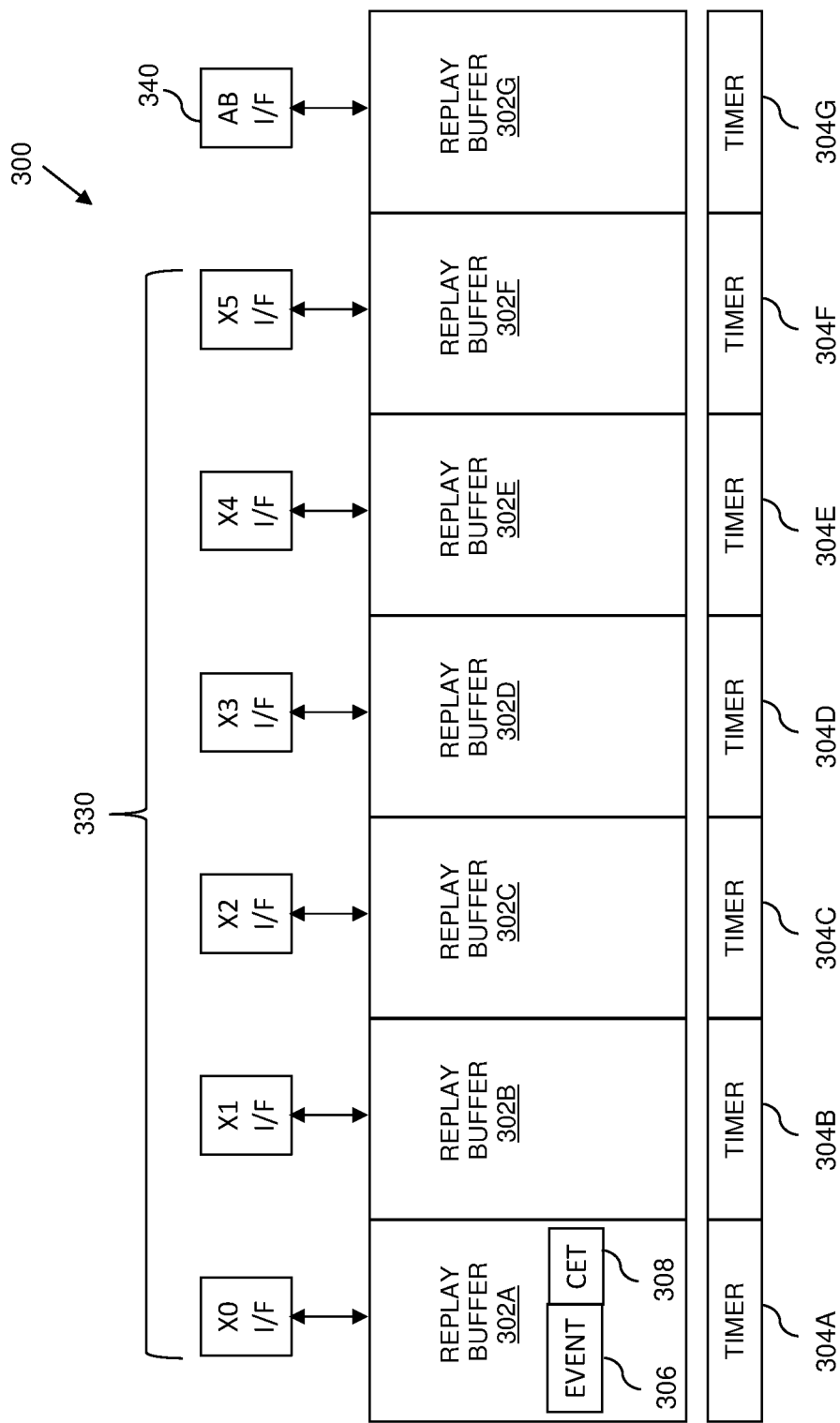
FIG. 4 depicts a block diagram of replay buffers and timers according to one or more embodiments of the invention.

FIG. 4 depicts a block diagram 300 of replay buffers 302A-302G and timers 304A-304G according to one or more embodiments. Links of the cross-module bus 130 and/or the system bus 140 of FIGS. 2 and 3 can become unavailable at any time during an SSFM broadcast sequence. An uncertainty window can be introduced once a link unavailable event happens. An SSFM event can be sent within the uncertainty window prior to the link unavailable event and may or may not be delivered. For the case where the SSFM had been delivered during the uncertainty window already, replay of the same SSFM after the link became available can be performed. Replay can be governed by the CET checking mechanism as well. In an event where the RCET is the same as the LCET, the replayed SSFM can overwrite the SSFM already received during the uncertainty window.

Each cross-module bus interface 330 and system bus interface 340 can have an associated replay buffer 302 and timer 304. For example, cross-module bus interfaces 330 can include an x0 interface linked to replay buffer 302A and timer 304A, an x1 interface linked to replay buffer 302B and timer 304B, an x2 interface linked to replay buffer 302C and timer 304C, an x3 interface linked to replay buffer 302D and timer 304D, an x4 interface linked to replay buffer 302E and timer 304E, and an x5 interface linked to replay buffer 302F and timer 304F. The cross-module bus interface 330 can establish links between x0-x5 communication interfaces for the cross-module bus 130 to other CP chips in the same drawer. System bus interface 340 (ABUS I/F) can link a CP chip of one drawer to a CP chip of another drawer using the system bus 140.

Some embodiments can use a single replay buffer for all xbus interfaces, since the same SSFM for an event is broadcasted to xbus0-5 from a chip. An advantage of such a configuration is that five replay buffers can be removed, hence reducing power and area for the chip. A potential disadvantage of such a configuration is that if any one of the six xbus links became unavailable, replay would be sent to all six xbus ports instead of just the xbus port associated with the link that became unavailable.

Any SSFM event sent on the cross-module bus 130 or the system bus 140 can be pushed into a corresponding replay buffer 302A-302G and monitored using a corresponding timer 304A-304G. For example, a timer pulse can be generated based on a configurable timer value. The timer 304A-304G of all entries in the replay buffers 302A-302G can be incremented by every timer pulse. The timer 304A-304G of the oldest entry in the respective replay buffers 302A-302G can be checked against an uncertainty window value. The entries can include events 306, such as SSFM events, and CET values 308. An entry can be retired from the replay buffers 302A-302G if the associated timer 304A-304G value satisfied the uncertainty window. If a link unavailable event is detected, the CP chip can stop sending new SSFM events, reset and disable all timers 304A-304G associated with the replay buffer 302A-302G of the unavailable link, wait for the link unavailable event to be resolved, replay SSFM entries from the replay buffer 302A-302G of the previously unavailable link, and enable the timer 304A-304G after the corresponding entry is replayed. Timer pulses can be allowed to increment the corresponding timer 304A-304G. New SSFM events can be allowed once all entries have been replayed. Any nested link of unavailable events can be resolved. An error checker can be used to monitor for a maximum number of different CET values present in the replay buffer 302A-302G. An error checker can be used to monitor for a maximum distance between a CET value in the replay buffer 302A-302G and a local CET value.

Figure 5:
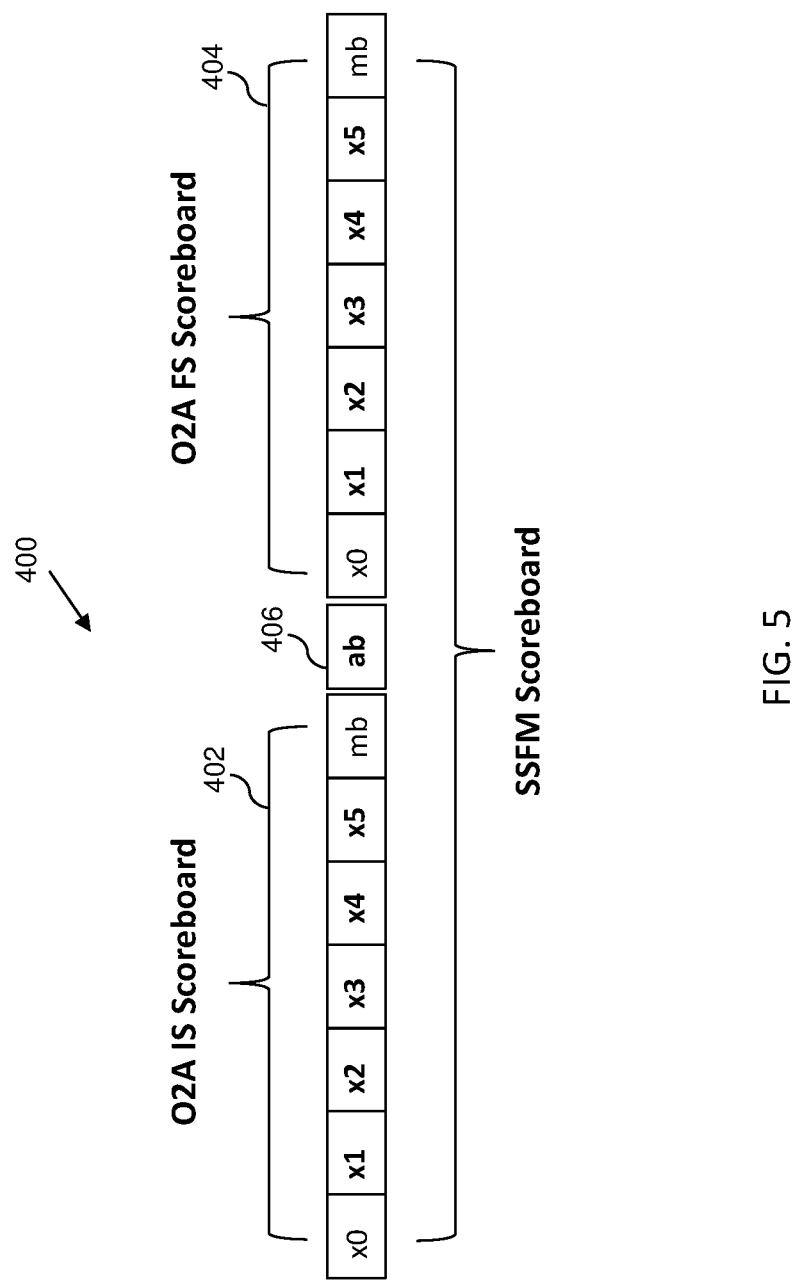
FIG. 5 depicts a block diagram of a scoreboard according to one or more embodiments of the invention.

FIG. 5 depicts a block diagram of a scoreboard 400 according to one or more embodiments. The scoreboard 400 can be an SSFM scoreboard that includes a one-to-all in-scope scoreboard 402, and a one-to-all full-scope scoreboard 404. The scoreboard 400 can also include a system bus tracker 406. There can be one instance of the scoreboard 400 for each type of associated event per CP chip. The scoreboard 400 can be used for one-to-all (O2A) status sources from a single CP chip that must be seen by every CP chip in the system 100 of FIG. 1. An O2A IS can be tracked for an event that needs to be rebroadcast to a remote drawer when received on the cross-module bus 130 or the module bus 120. An O2A IS can also be tracked for an event that needs to be rebroadcast to a drawer as FS when received on the system bus 140. An O2A FS can be tracked for an event that does not need to be rebroadcast. Status information (e.g., bit flags) of the O2A IS scoreboard 402 can include x0-x5 for links of the cross-module bus 130 and mb for a link of the module bus 120. Status information of the O2A FS scoreboard 404 can include x0-x5 for links of the cross-module bus 130 and mb for a link of the module bus 120. The O2A IS scoreboard 402 can be used to rebroadcast a first IS rise event to a remote entity and/or rebroadcast a last IS fall event to a remote entity. Forwarding events to units on a CP chip can be encoded as 1 for a fast hang avoidance (FHA) rise and 0 for dropping the FHA. The FHA can be an indicator that forward progress has halted and traffic should be stopped to let the associated interface catch-up and/or resolve the issue.

As an example, where a redundant event may be broadcast to a remote drawer, referring again to FIG. 3, the link for the cross-module bus 130 between CP4 and CP3 of drawer 102 may be unavailable. CP4 can broadcast an FHA rise O2A IS SSFM to all CP chips in drawer 102. CP3 may also broadcast an FHA rise O2A IS SSFM to all CP chips in drawer 102. CP6 of drawer 102 can receive the FHA rise O2A IS SSFM from CP4 and rebroadcast to drawer 108. CP6 may also receive the FHA rise O2A IS SSFM from CP3 and rebroadcast to drawer 108. Using the scoreboard 400 to track the status of events, such as an FHA rise, being broadcast can prevent redundant event broadcasts by identifying and filtering subsequent rebroadcast attempts of the same event.

As another example, multiple event broadcasts may override each other. For instance, CP3 of drawer 102 may broadcast an FHA drop O2A IS SSFM to all CP chips in drawer 102. CP6 of drawer 102 can receive the FHA drop O2A IS SSFM from CP3 and rebroadcast to drawer 108. CP6 of drawer 102 and drawer 108 can drop the FHA that was set by CP4 of drawer 102 thereby overriding from the same drawer 102. A link of the system bus 140 between drawer 102 and drawer 104 may be unavailable. Drawer 104 can broadcast an FHA drop O2A IS SSFM to drawer 108. Drawer 108 can then drop the FHA that was set by drawer 102 thereby overriding from a different drawer. Using the scoreboard 400 to track the status of events, such as an FHA drop, being broadcast can prevent overriding event broadcasts by identifying and filtering multiple overriding events.

In embodiments, the O2A IS scoreboard 402 can be updated based on receiving one or more events on the cross-module bus 130 or the module bus 120 for rebroadcast on the system bus 140. Rebroadcasting the one or more events on the cross-module bus 130 as an FS broadcast can be performed based on being received on the system bus 140. The O2A FS scoreboard 404 can be updated based on receiving one or more events on the system bus 140 as the FS broadcast.

Figure 6:
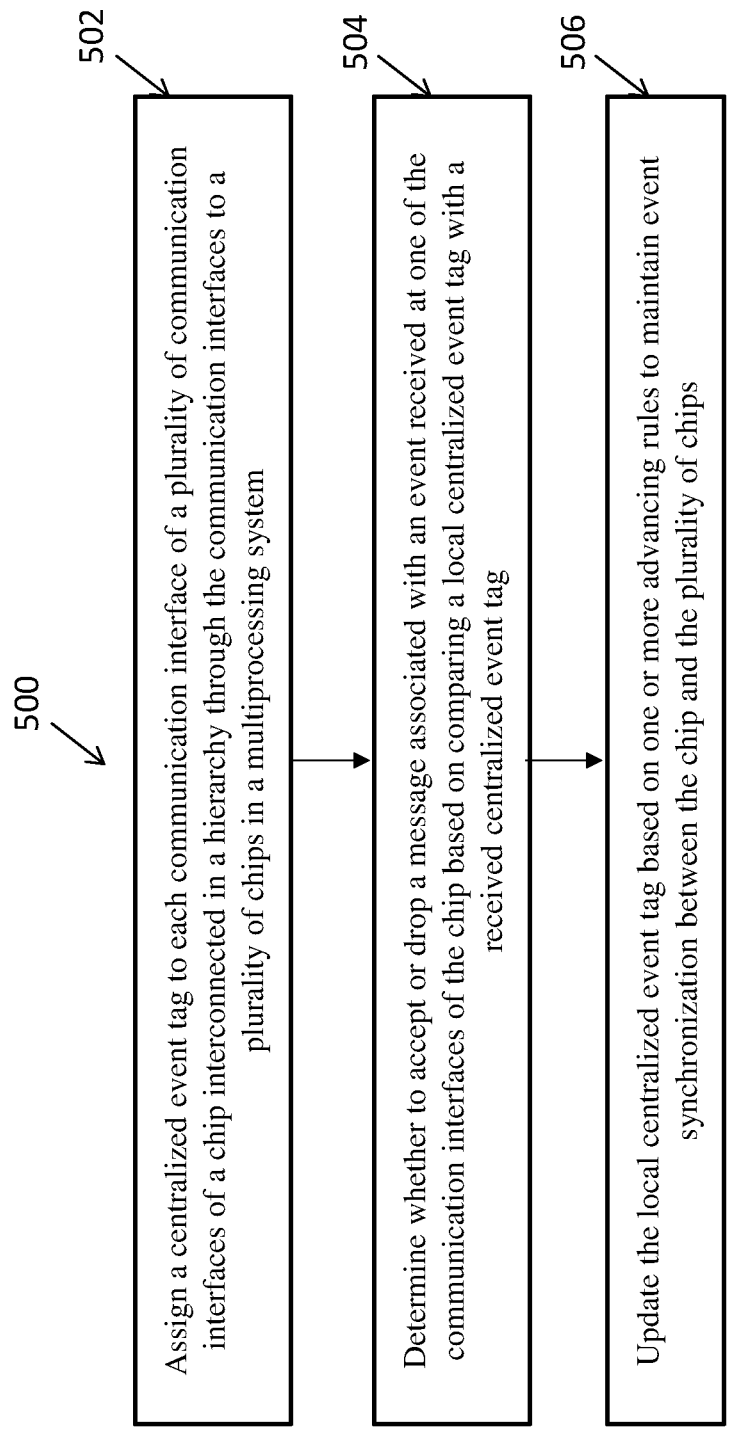
FIG. 6 depicts a flow diagram of a method for SMP synchronization according to one or more embodiments of the invention.

FIG. 6 depicts a flow diagram of a method 500 for SMP synchronization according to one or more embodiments of the invention. At least a portion of the method 500 can be executed, for example, by the processor 701 shown in FIG. 8. Further, the method 500 can be implemented in the system 100 of FIG. 1. The method 500 includes assigning a CET to each communication interface of a plurality of communication interfaces of a chip interconnected in a hierarchy through the communication interfaces to a plurality of chips, such as CP chips, CP0-CP7, in a multiprocessing system 100 at block 502. The communication interfaces can include a module bus interface for the module bus 120, cross-module bus interfaces 330 for the cross-module bus 130, and/or a system bus interface 340 for the system bus 140. The same initial value can be used for the CET for the module bus 120, cross-module bus 130, and system bus 140.

At block 504, the method 500 includes determining whether to accept or drop a message associated with an event received at one of the communication interfaces of the chip based on comparing a local CET with a received CET. Various conditions can be evaluated in combination with the local CET with a received CET for evaluating an SSFM. An event broadcast may be performed be an event is achieved on one of the CP chips. For example, A2A IS SSFM can be broadcast to all CP chips on the same drawer, and the CET can be included for local comparisons. An SSFM can be accepted if the received CET is the same as the local CET. The SSFM can be dropped if the received CET is older that the local CET. An inferred reset can be generated if the received CET is newer than the local CET.

At block 506, the method 500 includes updating the local CET based on one or more advancing rules to maintain event synchronization between the chip and the plurality of chips. For example, the local CET may advance (e.g., increment) if an SSFM broadcast is completed. The local CET may advance if an inferred reset was generated. The local CET may advance if an SWR was received prior to an inferred reset or completion. The local CET can advance if the SWR coincides with an inferred reset or completion. Other advancing rules can be used depending on the effects of various events.

Additional processes and/or steps may also be included in the method 500. It should be understood that the process depicted in FIG. 6 represent an illustration and that other processes may be added or existing processes may be removed, modified, or rearranged without departing from the scope of the present disclosure.

Figure 7A:
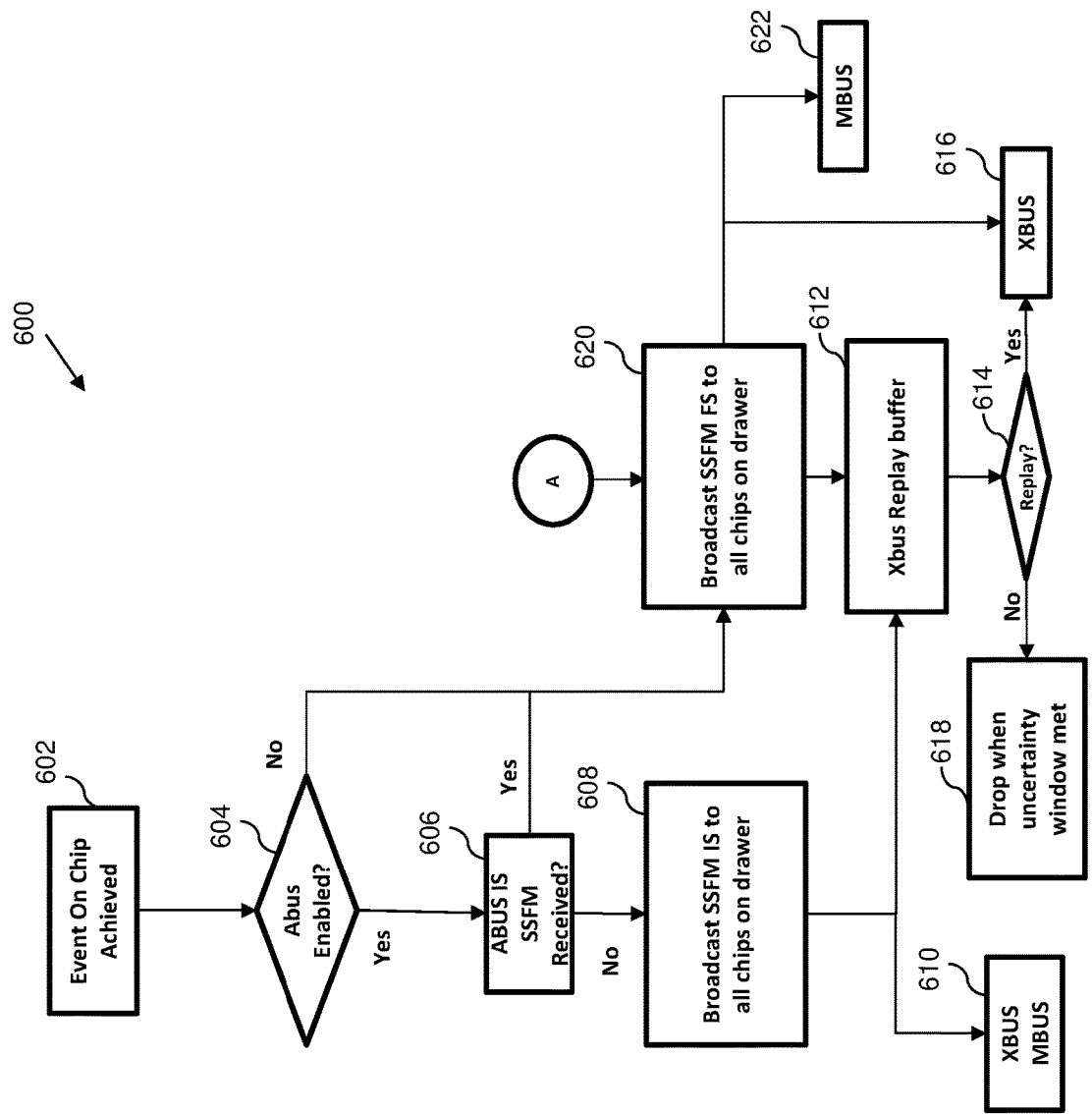
FIGS. 7A and 7B collectively depict a flow diagram of a method for SMP synchronization according to one or more embodiments of the invention.
Figure 7B:
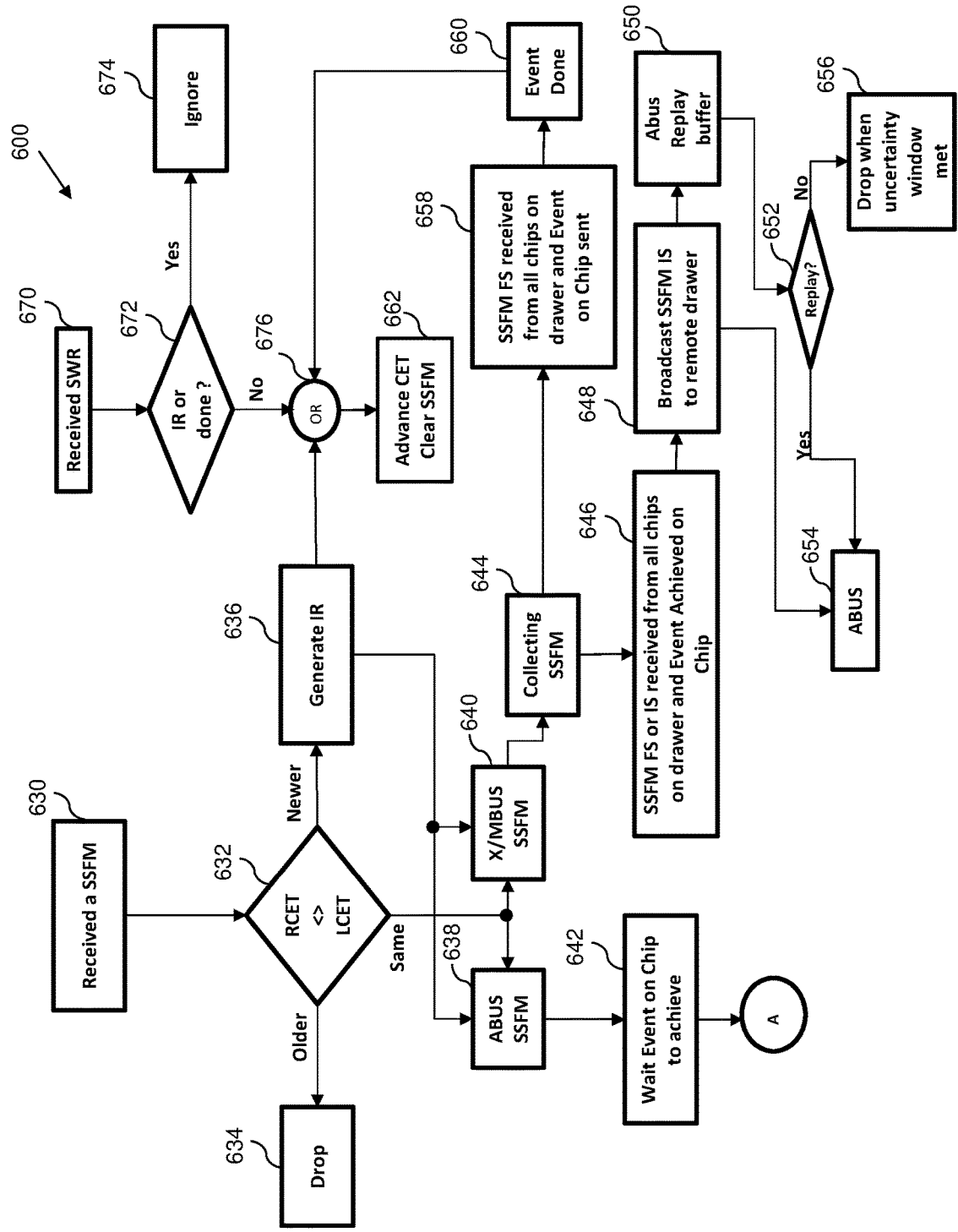

FIGS. 7A and 7B collectively depict a flow diagram of a method 600 for SMP synchronization according to one or more embodiments. The method 600 can be performed, for example, by the system 100 of FIG. 1. Although depicted as a combined process flow, portions of the method 600 can be removed, subdivided, combined, or expanded in embodiments of the invention.

At block 602, a CP chip can determine that event completion was achieved on the CP chip. At block 604, the CP chip can determine whether the system bus 140 is enabled. If the system bus 140 is enabled, then a block 606 a check can be performed to determine whether an IS SSFM has been received on the system bus 140. If the IS SSFM has not been received on the system bus 140, an SSFM IS broadcast can be performed to all CP chips on the drawer at block 608. The broadcast can be performed on the cross-module bus 130 and the module bus 120 at block 610, and a replay buffer 302A-302F associated with the corresponding link of the cross-module bus interface 330 for the cross-module bus 130 can be accessed at block 612. At block 614, a replay condition can be checked. At block 616, one or more events from the replay buffer 302A-302F can be replayed on the cross-module bus 130 based on a replay condition being met. At block 618, one or more events can be dropped from the replay buffer 302A-302F based on an uncertainty window being met.

At block 620, an SSFM FS message can be broadcast to all of the CP chips in a same drawer as the CP chip to indicate the event completion based on determining that the system bus 140 is not enabled for the CP chip at block 604 or an IS completion message has been received at the CP chip at block 606. Broadcasting the SSFM FS message within the drawer can include accessing the replay buffer 302A-302F for the cross-module bus 130 at block 612, the cross-module bus 130 at block 616, and the module bus 120 at block 622.

At block 630 of FIG. 7B, a message, such as an SSFM can be received at a CP chip. The message can include a received CET. At block 632, the received CET can be compared to a local CET. The CETs can be managed per communication interface of the CP chip.

At block 634, the message can be dropped based on determining that the message is associated with an older event at block 632, where the received CET is older than the local CET.

At block 636, an inferred reset can be generated based on determining that the message is associated with a newer event at block 632, where the received CET is newer than the local CET.

At block 638, if the message was received on the system bus 140 and either the received CET matches the local CET at block 632 or the inferred reset was generated at block 636, there can be a waiting period for an event to be achieved on the CP chip at block 642 before proceeding to block 620 of FIG. 7A.

At block 640, if the SSFM was received from the cross-module bus 130 or the module bus 120 and either the received CET matches the local CET at block 632 or the inferred reset was generated at block 636, message collection can be performed at block 644. Thus, blocks 638 and 640 can forward a message to a corresponding interface handling unit based on the message being received from the system bus 140, the cross-module bus 130, or the module bus 120, and determining that the received centralized event tag matches the local centralized event tag. At block 646, an SSFM FS message or an IS message can be received from all of the CP chips and event completion occurs on the CP chip. At block 648, an SSFM IS message can be broadcast to a remote drawer based on determining that an SSFM FS message or an IS message has been received from all of the CP chips and event completion occurred on the CP chip. A replay buffer 302G of the system bus 140 can be accessed at block 650.

At block 652, a check for a replay condition can be performed. At block 654, one or more events from the replay buffer 302G can be replayed on the system bus 140 based on the replay condition being met at block 652. Block 654 may also be reached after block 648 to broadcast to a remote drawer on the system bus 140. At block 656, one or more events from the replay buffer 302G can be dropped based on an uncertainty window being met and the replay condition not being met at block 652.

After collecting SSFM responses at block 644, an SSFM FS message can be received from all of the CP chips on the drawer and event completion can occur on the CP chip at block 658. When the event is done at block 660, the local CET can be advanced and the SSFM cleared at block 662.

At block 670, a SWR can be received. At block 672, a determination can be made whether an inferred reset has been completed or event processing is done based on receiving the SWR. At block 674, the SWR can be ignored based on determining that the inferred reset has been completed. Through a logical-OR block 676, the local CET can be advanced and the SSFM cleared at block 662 based on determining that the inferred reset has not been completed at block 672. Block 662 can also be reached through the logical-OR block 676 after block 636 or block 660.

In summary, SSFM synchronization can use CETs for all communication interfaces in a distributed system of CP chips. Comparing a received CET with a local CET can determine if an SSFM can be dropped or accepted. An inferred reset can be generated to synchronize an SSFM event on a CP chip to a new SSFM event. CET values can be advanced by the advancing rules based on multiple factors, such as broadcast completion, inferred reset, and SWR. Replay buffers 302A-302G with timers 304A-304G can be used to account for uncertainty windows. The timers 304A-304G for entries in the replay buffers 302A-302G can be advanced based on a timer pulse. Replay entries can be retired based on the value of a timer 304A-304G satisfying an uncertainty window. A scoreboard 400 can be used to track O2A SSFM IS and FS in a distributed system of CP chips to avoid redundant O2A events for a remote drawer and/or avoid O2A events overriding each other from different chips.

Figure 8:
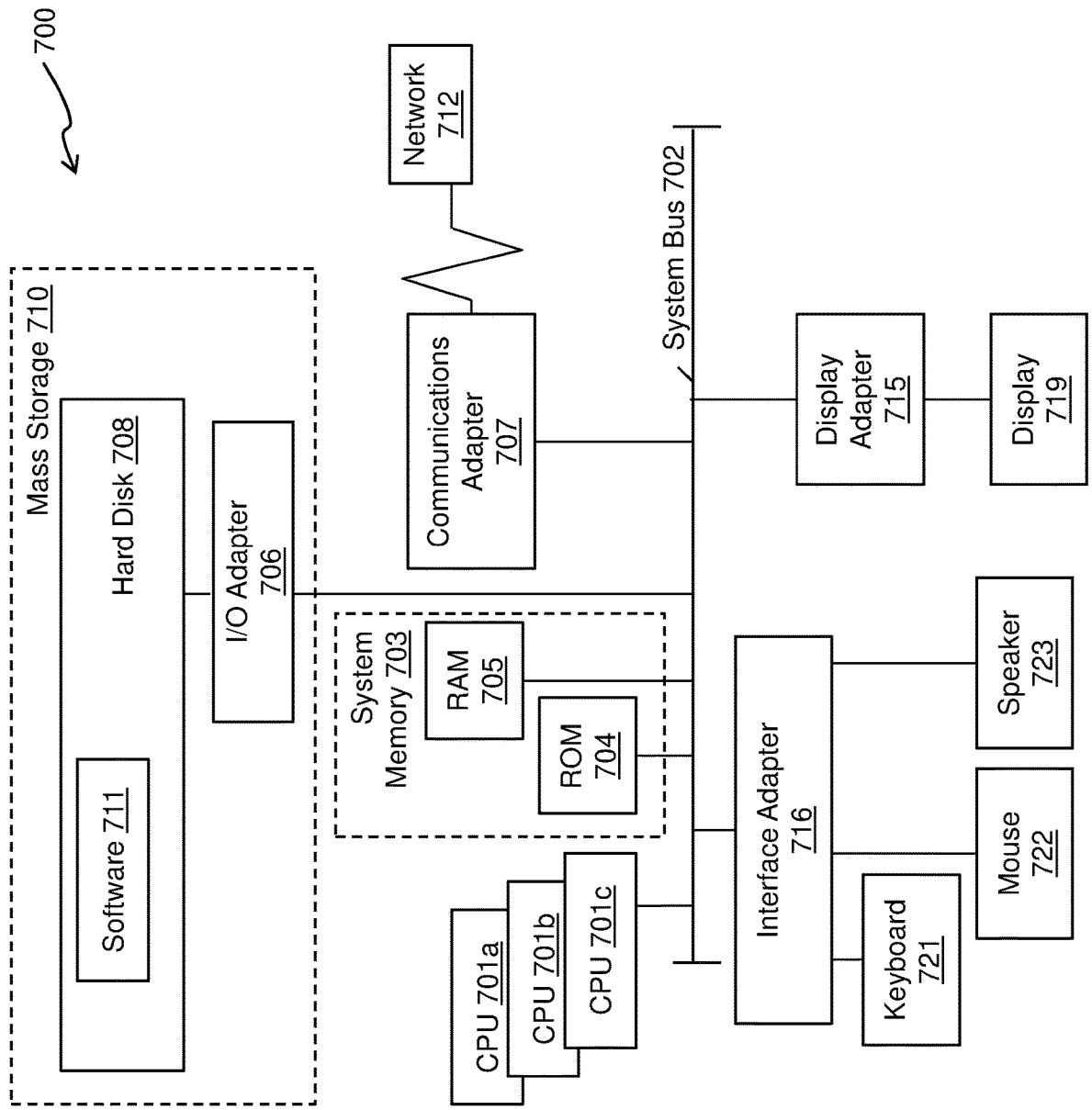
FIG. 8 depicts a block diagram of a computer system in accordance with one or more embodiments of the present invention.

Turning now to FIG. 8, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 700 has one or more central processing units (CPU(s)) 701*a*, 701*b*, 701*c*, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM)

704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 8.

Additional input/output devices are shown as connected to the system bus 702 via a display adapter 715 and an interface adapter 716. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 8 is not intended to indicate that the computer system 700 is to include all of the components shown in FIG. 8. Rather, the computer system 700 can include any appropriate fewer or additional components not illustrated in FIG. 8 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   assigning a centralized event tag to each communication interface of a plurality of communication interfaces of a chip interconnected in a hierarchy through the communication interfaces to a plurality of chips in a multiprocessing system;
   determining whether to accept or drop a message associated with an event received at one of the communication interfaces of the chip based on comparing a local centralized event tag with a received centralized event tag; and
   updating the local centralized event tag based on one or more advancing rules to maintain event synchronization between the chip and the plurality of chips.

2. The computer-implemented method of claim 1, wherein the multiprocessing system comprises a plurality of drawers connected through a system bus, a plurality of modules per drawer connected through a cross-module bus, and at least two of the chips per module connected through a module bus.

3. The computer-implemented method of claim 2, further comprising:
   determining an event completion on the chip;
   broadcasting a full scope message to all of the chips in a same drawer as the chip to indicate the event completion based on determining that the system bus is not enabled for the chip or an in-scope completion message has been received at the chip;
   broadcasting an in-scope message to all of the chips in the same drawer as the chip to indicate the event completion based on determining that the system bus is enabled for the chip and an in-scope completion message has not been received at the chip;
   accessing a replay buffer of the cross-module bus;
   replaying one or more events from the replay buffer on the cross-module bus based on a replay condition being met; and
   dropping the one or more events from the replay buffer based on an uncertainty window being met.

4. The computer-implemented method of claim 2, further comprising:
   dropping the message based on determining that the message is associated with an older event, where the received centralized event tag is older than the local centralized event tag;
   generating an inferred reset based on determining that the message is associated with a newer event, where the received centralized event tag is newer than the local centralized event tag; and
   forwarding the message to a corresponding interface handling unit based on the message being received from the system bus, the cross-module bus, or the module bus, and determining that the received centralized event tag matches the local centralized event tag.

5. The computer-implemented method of claim 4, further comprising:
   broadcasting an in-scope message to a remote drawer based on determining that a full-scope message or an in-scope message has received from all of the chips and an event completion has occurred on the chip;
   accessing a replay buffer of the system bus;
   replaying one or more events from the replay buffer on the system bus based on a replay condition being met;
   dropping the one or more events from the replay buffer based on an uncertainty window being met; and
   advancing the local centralized event tag based on receiving the full-scope message from all of the chips and the event completion has occurred on the chip.

6. The computer-implemented method of claim 2, further comprising:
  determining whether an inferred reset has been completed based on receiving a system-wide reset;
  ignoring the system-wide reset based on determining that the inferred reset has been completed; and
  advancing the local centralized event tag based on determining that the inferred reset has not been completed.

7. The computer-implemented method of claim 2, further comprising:
  updating a one-to-all in-scope scoreboard based on receiving one or more events on the cross-module bus or the module bus for rebroadcast on the system bus;
  rebroadcasting the one or more events on the cross-module bus as a full-system broadcast based on being received on the system bus; and
  updating a one-to-all full-scope scoreboard based on receiving one or more events on the system bus as the full-system broadcast.

8. A system comprising:
  a plurality of chips interconnected in a hierarchy through a plurality of communication interfaces; and
  a chip of the hierarchy is configured to:
    assign a centralized event tag to each of the communication interfaces of the chip;
    determine whether to accept or drop a message associated with an event received at one of the communication interfaces of the chip based on comparing a local centralized event tag with a received centralized event tag; and
    update the local centralized event tag based on one or more advancing rules to maintain event synchronization between the chip and the plurality of chips.

9. The system of claim 8, further comprising a plurality of drawers connected through a system bus, a plurality of modules per drawer connected through a cross-module bus, and at least two of the chips per module connected through a module bus.

10. The system of claim 9, wherein the chip is further configured to perform:
  determining an event completion on the chip;
  broadcasting a full scope message to all of the chips in a same drawer as the chip to indicate the event completion based on determining that the system bus is not enabled for the chip or an in-scope completion message has been received at the chip;
  broadcasting an in-scope message to all of the chips in the same drawer as the chip to indicate the event completion based on determining that the system bus is enabled for the chip and an in-scope completion message has not been received at the chip;
  accessing a replay buffer of the cross-module bus;
  replaying one or more events from the replay buffer on the cross-module bus based on a replay condition being met; and
  dropping the one or more events from the replay buffer based on an uncertainty window being met.

11. The system of claim 9, wherein the chip is further configured to perform:
  dropping the message based on determining that the message is associated with an older event, where the received centralized event tag is older than the local centralized event tag;
  generating an inferred reset based on determining that the message is associated with a newer event, where the received centralized event tag is newer than the local centralized event tag; and
  forwarding the message to a corresponding interface handling unit based on the message being received from the system bus, the cross-module bus, or the module bus, and determining that the received centralized event tag matches the local centralized event tag.

12. The system of claim 11, wherein the chip is further configured to perform:
  broadcasting an in-scope message to a remote drawer based on determining that a full-scope message or an in-scope message has received from all of the chips and an event completion has occurred on the chip;
  accessing a replay buffer of the system bus;
  replaying one or more events from the replay buffer on the system bus based on a replay condition being met;
  dropping the one or more events from the replay buffer based on an uncertainty window being met; and
  advancing the local centralized event tag based on receiving the full-scope message from all of the chips and the event completion has occurred on the chip.

13. The system of claim 9, wherein the chip is further configured to perform:
  determining whether an inferred reset has been completed based on receiving a system-wide reset;
  ignoring the system-wide reset based on determining that the inferred reset has been completed; and
  advancing the local centralized event tag based on determining that the inferred reset has not been completed.

14. The system of claim 9, wherein the chip is further configured to perform:
  updating a one-to-all in-scope scoreboard based on receiving one or more events on the cross-module bus or the module bus for rebroadcast on the system bus;
  rebroadcasting the one or more events on the cross-module bus as a full-system broadcast based on being received on the system bus; and
  updating a one-to-all full-scope scoreboard based on receiving one or more events on the system bus as the full-system broadcast.

15. A computer program product comprising a non-transitory computer readable storage medium having program instructions embodied therewith, the program instructions executable by one or more processors to cause the one or more processors to perform operations comprising:
  assigning a centralized event tag to each communication interface of a plurality of communication interfaces of a chip interconnected in a hierarchy through the communication interfaces to a plurality of chips in a multiprocessing system;
  determining whether to accept or drop a message associated with an event received at one of the communication interfaces of the chip based on comparing a local centralized event tag with a received centralized event tag; and
  updating the local centralized event tag based on one or more advancing rules to maintain event synchronization between the chip and the plurality of chips.

16. The computer program product of claim 15, wherein the multiprocessing system comprises a plurality of drawers connected through a system bus, a plurality of modules per drawer connected through a cross-module bus, and at least two of the chips per module connected through a module bus.

17. The computer program product of claim 16, wherein the program instructions are executable by the one or more processors to cause the one or more processors to perform operations comprising:

determining an event completion on the chip;

broadcasting a full scope message to all of the chips in a same drawer as the chip to indicate the event completion based on determining that the system bus is not enabled for the chip or an in-scope completion message has been received at the chip;

broadcasting an in-scope message to all of the chips in the same drawer as the chip to indicate the event completion based on determining that the system bus is enabled for the chip and an in-scope completion message has not been received at the chip;

accessing a replay buffer of the cross-module bus;

replaying one or more events from the replay buffer on the cross-module bus based on a replay condition being met; and dropping the one or more events from the replay buffer based on an uncertainty window being met.

18. The computer program product of claim 16, wherein the program instructions are executable by the one or more processors to cause the one or more processors to perform operations comprising:

dropping the message based on determining that the message is associated with an older event, where the received centralized event tag is older than the local centralized event tag;

generating an inferred reset based on determining that the message is associated with a newer event, where the received centralized event tag is newer than the local centralized event tag; and forwarding the message to a corresponding interface handling unit based on the message being received from the system bus, the cross-module bus, or the module bus, and determining that the received centralized event tag matches the local centralized event tag.

19. The computer program product of claim 16, wherein the program instructions are executable by the one or more processors to cause the one or more processors to perform operations comprising:

determining whether an inferred reset has been completed based on receiving a system-wide reset;

ignoring the system-wide reset based on determining that the inferred reset has been completed; and advancing the local centralized event tag based on determining that the inferred reset has not been completed.

20. The computer program product of claim 16, wherein the program instructions are executable by the one or more processors to cause the one or more processors to perform operations comprising:

updating a one-to-all in-scope scoreboard based on receiving one or more events on the cross-module bus or the module bus for rebroadcast on the system bus;

rebroadcasting the one or more events on the cross-module bus as a full-system broadcast based on being received on the system bus; and updating a one-to-all full-scope scoreboard based on receiving one or more events on the system bus as the full-system broadcast.

* * * * *